(12) United States Patent
Bak et al.

(10) Patent No.: US 7,181,732 B2
(45) Date of Patent: Feb. 20, 2007

(54) METHOD AND APPARATUS FOR FACILITATING LAZY TYPE TAGGING FOR COMPILED ACTIVATIONS

(75) Inventors: Lars Bak, Tranbjerg J. (DK); Kasper V. Lund, Aarhus C. (DK)

(73) Assignee: Sun Microsystems, Inc., Santa Clara, CA (US)

( * ) Notice: Subject to any disclaimer, the term of this patent is extended or adjusted under 35 U.S.C. 154(b) by 840 days.

(21) Appl. No.: 10/121,899

(22) Filed: Apr. 12, 2002

(65) Prior Publication Data

US 2003/0093778 A1 May 15, 2003

Related U.S. Application Data

(60) Provisional application No. 60/332,925, filed on Nov. 14, 2001.

(51) Int. Cl.
*G06F 9/45* (2006.01)
*G06F 9/44* (2006.01)

(52) U.S. Cl. .................... 717/140; 717/118; 717/139; 707/206

(58) Field of Classification Search ............... 717/118, 717/136, 139, 140; 707/206
See application file for complete search history.

(56) References Cited

U.S. PATENT DOCUMENTS 5,893,121 A * 4/1999 Ebrahim et al. ............ 707/206
5,933,635 A * 8/1999 Holzle et al. ............... 717/151
5,953,736 A * 9/1999 O'Connor et al. ............ 711/6
6,098,089 A * 8/2000 O'Connor et al. .......... 718/104
6,119,206 A * 9/2000 Tatkar et al. ............... 711/147

FOREIGN PATENT DOCUMENTS

EP 0 908 820 A2 4/1999

OTHER PUBLICATIONS

Ravenbrook Ltd., 2001, The Memory Management Glossary, Section A, pp. 1-5 located online at: http://www.memorymanagement.org/glossary/a.html.*
Web Resource, Feb. 1996, Ada Index: Run Time Structures, pp. 1-2, located online at: http://www.informatik.uni-stuttgart.de/ifi/bs/lehre/ei1/adanotes/Subprograms/runtime.html.*

(Continued)

*Primary Examiner*—Tuan Dam
*Assistant Examiner*—Andre R Fowlkes
(74) *Attorney, Agent, or Firm*—Park, Vaughan & Fleming LLP

(57) ABSTRACT

One embodiment of the present invention provides a system for type tagging values in a compiled activation frame in a lazy manner to facilitate garbage collection. This system operates in a mixed-mode environment that supports both interpretation of byte codes and execution of compiled native code. Upon receiving an invocation of a method, the system creates an activation frame for the method on the execution stack. If the method is executing in interpreted mode, the interpreter maintains a tag for each value in the activation frame during execution. The tag indicates whether the value is a reference type or a primitive type. However, if the method is executing in compiled mode, the system allocates space for tags for each value in the activation frame, but does not fill in the tags during execution. This allows the tags to be filled in at a future time when needed.

18 Claims, 4 Drawing Sheets

OTHER PUBLICATIONS

Publication entitled "Fast, Effective Code Generation in a Just-In-Time Java Compiler", by Ali-Reza Adl-Tabatabai et al., XP-000766277, pp. 280-290.

Publication entitled "Garbage Collection for Strongly-Typed Languages Using Run-Time Type Reconstruction", by Shail Aditya et al., XP-000522339, 1994 ACM, pp. 12-23.

* cited by examiner

METHOD AND APPARATUS FOR FACILITATING LAZY TYPE TAGGING FOR COMPILED ACTIVATIONS

RELATED APPLICATION

This application hereby claims priority under 35 U.S.C. §119 to U.S. Provisional Patent Application No. 60/332,925, filed on Nov. 14, 2001, entitled "Improving Performance In Virtual Machines," by inventors Lars Bak, Jacob R. Andersen, Kasper V. Lund and Steffen Grarup.

BACKGROUND

1. Field of the Invention

The present invention relates to compilers for computer systems. More specifically, the present invention relates to a method and an apparatus that facilitates lazy type tagging for compiled activations to facilitate garbage collection.

2. Related Art

The exponential growth of the Internet has in part been fueled by the development of computer languages, such as the JAVA™ programming language distributed by Sun Microsystems, Inc. of Palo Alto, Calif. The JAVA programming language allows an application to be compiled into a module containing platform-independent byte codes, which can be distributed across a network of many different computer systems. Any computer system possessing a corresponding platform-independent virtual machine, such as the JAVA virtual machine, is then able to execute the byte codes. In this way, a single form of the application can be easily distributed to and executed by a large number of different computing platforms.

When an application is received in platform-independent form, it can be interpreted directly through an interpreter, or alternatively, it can be compiled into machine code for the native architecture of the computing platform. Executing native code is typically significantly faster than interpreting platform-independent byte codes. However, native code occupies considerably more space than the corresponding byte codes. Some "mixed-mode" computer systems support both interpretation of byte codes and execution of compiled native code.

A platform-independent virtual machine periodically performs garbage collection operations to reclaim previously allocated memory space that is no longer being used. During a garbage collection operation, it is necessary to identify pointers within activation frames on the stack. Traditionally, this has been done by maintaining stack maps for each method that is currently executing, or by maintaining a tag for each value in each activation frame indicating whether the value is a reference type or a primitive type. While maintaining tags for each value facilitates simpler garbage collection, the overhead involved in maintaining tags for each value can reduce execution speed. This can be explained by the fact that many methods execute to completion without having to be examined by a garbage collection operation. Hence, the time involved in maintaining tags for these methods is largely wasted.

Furthermore, in "mixed-mode" systems, garbage collection operations typically work with two different types of activation frames, because activation frames for compiled methods are typically different in structure than activation frames for interpreted methods. Note that an activation frame for an interpreted version of a method is typically larger than a corresponding activation frame for a compiled version of the method. This is because the activation frame for the interpreted version typically includes additional data, such as type tags, which occupy more space. Hence, working with two different types of activation frames greatly complicates the garbage collection operation, as well as other operations that deal directly with activation frames.

Hence, what is needed is a method and an apparatus that facilitates type tagging for compiled activations without the problems described above.

SUMMARY

One embodiment of the present invention provides a system for type tagging values in a compiled activation frame in a lazy manner to facilitate garbage collection. This system operates in a mixed-mode environment that supports both interpretation of byte codes and execution of compiled native code. Upon receiving an invocation of a method, the system creates an activation frame for the method on the execution stack. If the method is executing in interpreted mode, the interpreter maintains a tag for each value in the activation frame during execution. The tag indicates whether the value is a reference type or a primitive type. However, if the method is executing in compiled mode, the system allocates space for tags for each value in the activation frame, but does not fill in the tags during execution. This allows the tags to be filled in at a future time when needed.

In a variation on this embodiment, prior to receiving an invocation of a method, the system compiles the byte codes of the method into native code, and in doing so, gathers type information for each value in the activation frame of the method. The system embeds this type information into the native code associated with the method.

In a further variation on this embodiment, the system embeds the type information as bit vectors, wherein each bit specifies whether a corresponding value in the activation frame is a primitive type or a reference type.

In yet a further variation on this embodiment, the system embeds the bit vectors in the operands of dummy instructions in the native code.

In yet a further variation on this embodiment, the system embeds the bit vectors at locations following instructions in the native code that invoke other methods or the runtime system.

In a variation on this embodiment, the system performs a garbage collection operation. During this garbage collection operation, the system retrieves type information from the native code and stores the type information in the tags in the activation frame of the method.

In a variation on this embodiment, the system creates activation frames that are identical in structure for a method executing in compiled mode and the same method executing in interpreted mode.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
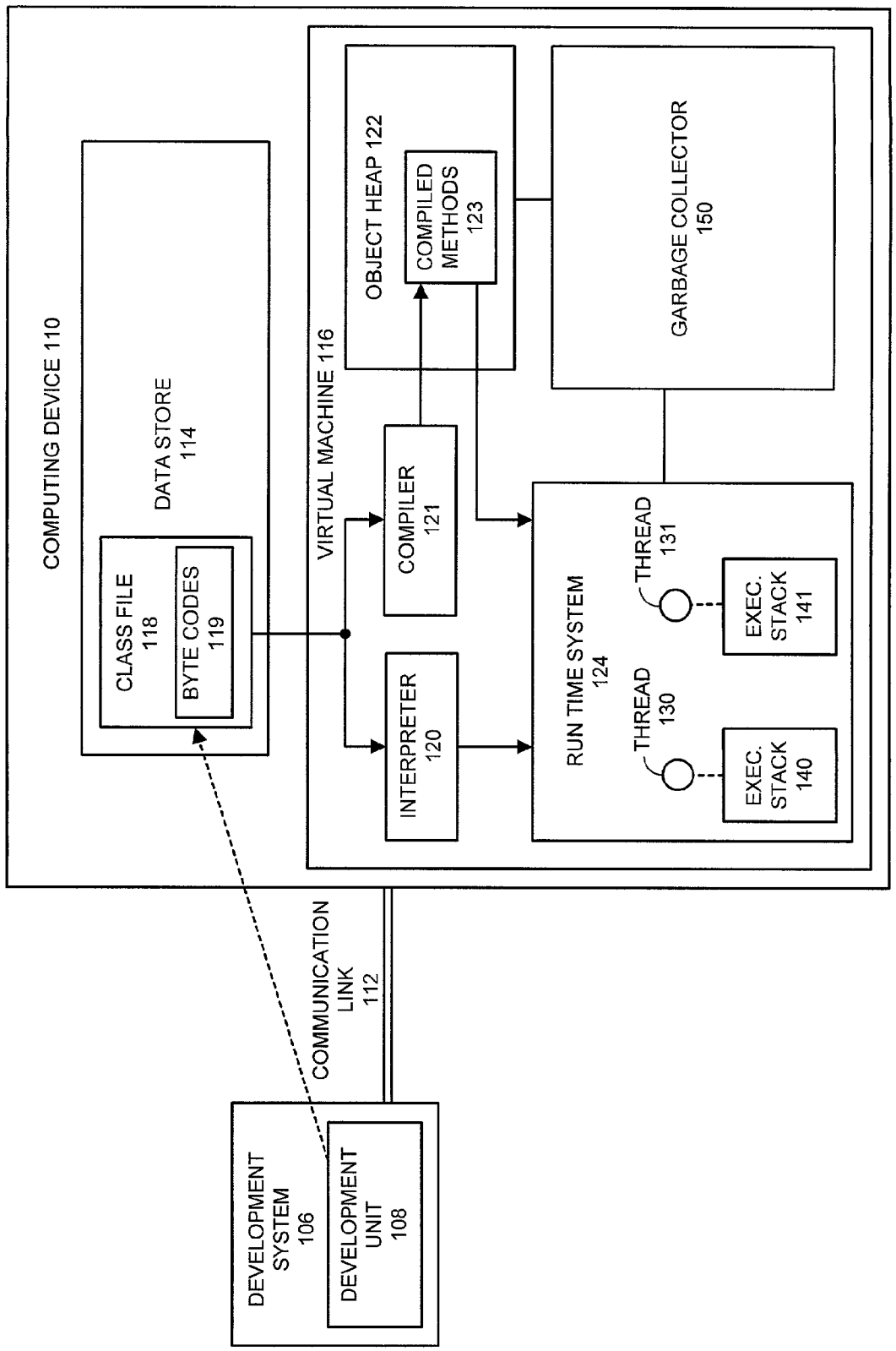
FIG. 1 illustrates a computing device in accordance with an embodiment of the present invention.

FIG. 1 illustrates a computing device 110 coupled to a development system 106 in accordance with an embodiment of the present invention. Development system 106 can generally include any type of computer system, including, but not limited to, a computer system based on a microprocessor, a mainframe computer, a digital signal processor, a portable computing device, a personal organizer, a device controller, or a computational engine within an appliance. Development system 106 contains development unit 108, which includes programming tools for developing platform-independent applications. This generally involves compiling an application from source code form into a platform-independent form, such as JAVA byte codes.

Development system 106 is coupled to computing device 110 through a communication link 112. Computing device 110 can include any type of computing device or system including, but not limited to, a mainframe computer system, a server computer system, a personal computer system, a workstation, a laptop computer system, a pocket-sized computer system, a personal organizer or a device controller. Computing device 110 can also include a computing device that is embedded within another device, such as a pager, a cellular telephone, a television, an automobile, or an appliance.

Communication link 112 can include any type of permanent or temporary communication channel that may be used to transfer data from development system 106 to computing device 110. This can include, but is not limited to, a computer network such as an Ethernet, a wireless communication link or a telephone line.

Computing device 110 includes data store 114, for storing code and data. Computing device 110 also includes virtual machine 116 for processing platform-independent applications retrieved from data store 114.

During the development process, a class file 118 is created within development unit 108. Class file 118 contains components of a platform-independent application to be executed in computing device 110. For example, class file 118 may include methods and fields associated with an object-oriented class. Note that these methods are specified using platform-independent byte codes 119.

Next, class file 118 is transferred from development unit 108, through communication link 112, into data store 114 within computing device 110. This allows virtual machine 116 to execute an application that makes use of components within class file 118. Note that virtual machine 116 can generally include any type of virtual machine that is capable of executing platform-independent code, such as the JAVA VIRTUAL MACHINE™ developed by SUN Microsystems, Inc. of Palo Alto Calif. (Sun, Sun Microsystems, Java and Java Virtual Machine are trademarks or registered trademarks of Sun Microsystems, Inc. in the United States and other countries.)

Virtual machine 116 includes object heap 122 for storing objects that are manipulated by code executing on virtual machine 116. Object heap 122 also stores compiled methods 123.

Virtual machine 116 also includes an interpreter 120, which interprets platform-independent byte codes 119 retrieved from data store 114 to facilitate program execution. During operation, interpreter 120 generally executes one byte code at a time as byte codes 119 are continuously read into interpreter 120.

Alternatively, virtual machine can use compiler 121 to compile methods from byte code form into native code form to produce compiled methods 123, which are stored in object heap 122.

Note that a compiled method, along with information from an associated activation record, can be used to restore an interpreter code equivalent of the compiled method. Alternatively, the interpreter code equivalent of the compiled method can be retrieved again from data store 114. Thus, the interpreter code equivalent of a compiled method may generally be obtained at any time.

Virtual machine 116 includes a runtime system 124. Runtime system 124 maintains state information for threads 130–131. This state information includes execution stacks 140–141, respectively. Execution stacks 140–141 store activation records for methods being executed by threads 130–131, respectively.

Runtime system 124 can either execute code using interpreter 120, or using compiled methods 123 received from object heap 122. When a method is invoked by virtual machine 116, the system first determines if the method is to be invoked as an interpreted method. If so, runtime system 124 activates interpreter 120.

If, on the other hand, the system determines that the method is to be invoked as a compiled method, runtime system 124 executes the compiled native code associated with the method. If the native code is not available it can be generated by activating compiler 121, which generates native code instructions from the byte codes.

Virtual machine 116 also includes garbage collector 150, which periodically reclaims unused storage from object heap 122. Note that garbage collector 150 may also remove compiled methods to reclaim storage.

Activation Frame

Figure 2:
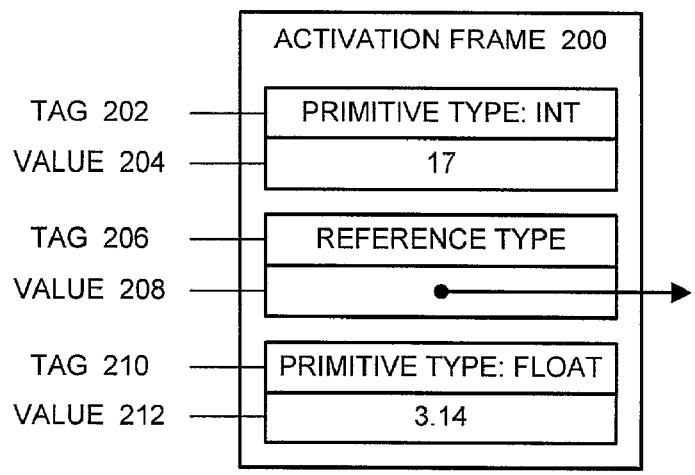
FIG. 2 illustrates an activation frame in accordance with an embodiment of the present invention.

FIG. 2 illustrates an activation frame in accordance with an embodiment of the present invention. Activation frame 200 contains values 204, 208, and 212. Activation frame 200 also contains tag 202, which describes value 204, tag 206, which describes value 208, and tag 210, which describes value 212. Both values 204 and 212 are primitive values as indicated by their respective tags. Value 208 is a reference type as indicated by tag 206.

Interpreted and Compiled Activation Frames

Figure 3:
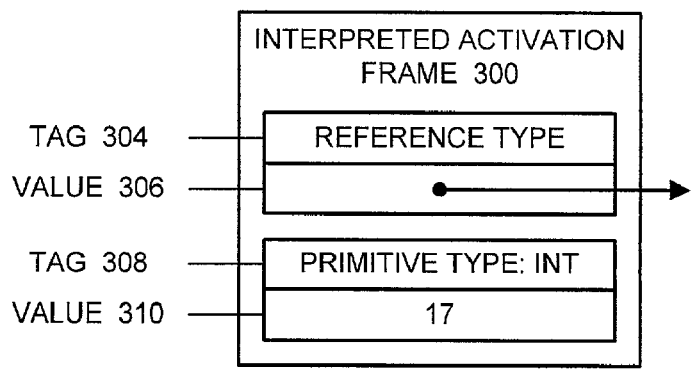
FIG. 3 illustrates an interpreted activation frame and a compiled activation frame in accordance with an embodiment of the present invention.
Figure 3:
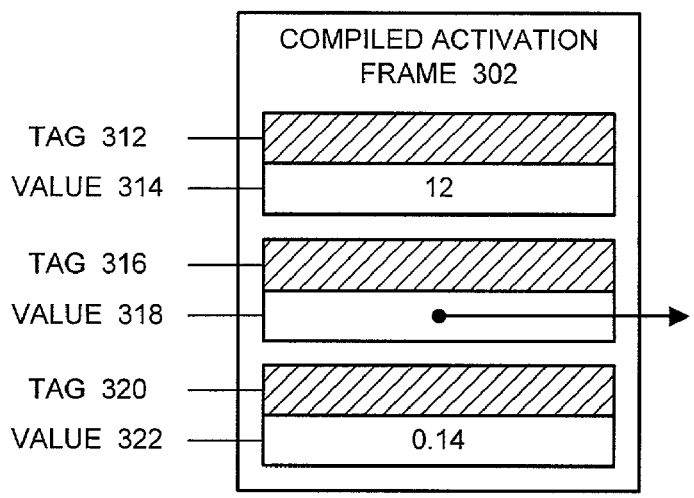

FIG. 3 illustrates an interpreted activation frame and a compiled activation frame in accordance with an embodiment of the present invention. Interpreted activation frame 300 contains value 306 which is a reference type as indicated by corresponding tag 304. Interpreted activation frame 300 also contains value 310 which is a primitive type as indicated by corresponding tag 308. Interpreter 120 maintains type tags eagerly (updates them as soon as possible) when interpreting byte codes 119 that manipulate the values in interpreted activation frame 300. This ensures that the interpreted activation frame 300 has type tags available for all values.

Compiled activation frame 302 contains values 314, 318, and 322. Compiled activation frame 302 also contains tag 312, which describes value 314, tag 316, which describes value 318, and tag 320, which describes value 322. Tags 312, 316, and 320 are left blank, and are filled in when a situation arrives where they are needed, such as during a garbage collection, or during a de-optimization operations as is discussed in U.S. Pat. No. 5,933,635, entitled "Method and Apparatus for Dynamically Deoptimizing Compiled Activations", by inventors Urs Holze and Lars Bak, filed on Oct. 6, 1997, and issued on Aug. 3, 1999. This application is hereby incorporated by reference. If at some point in the future the tags are filled in, then compiled activation frame 302 becomes essentially identical to interpreted activation frame 300 and can be treated in an identical manner.

Filling in Tag Information in a Compiled Activation Frame

Figure 4:
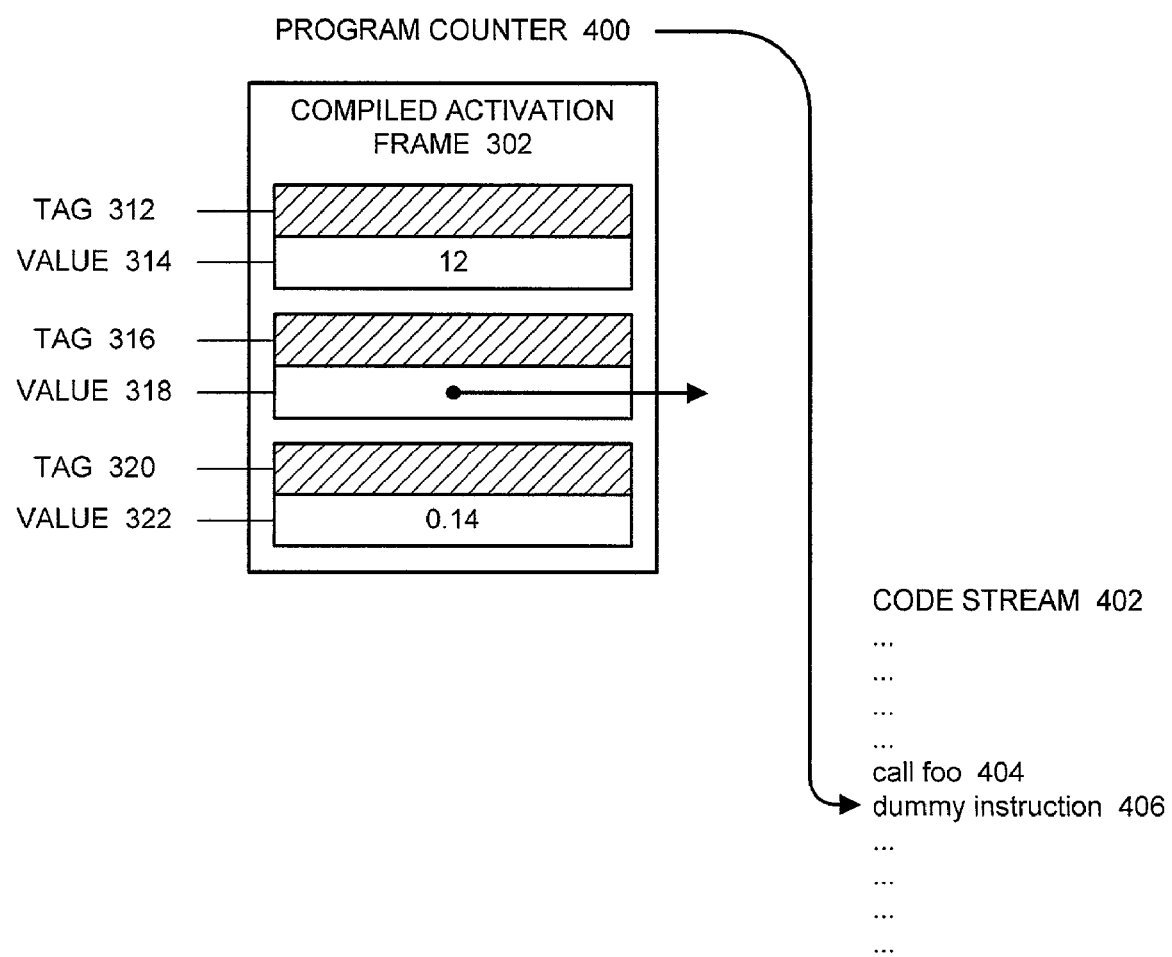
FIG. 4 illustrates the process of retrieving tag information from the compiled code stream in accordance with an embodiment of the present invention.

FIG. 4 illustrates the process of retrieving tag information from the compiled code stream in accordance with an embodiment of the present invention. When a situation arises where tags 312, 316, and 320 are needed to determine whether or not values 314, 318, and 322 are primitive or reference types, the type information for the tags is retrieved from code stream 402. This is accomplished by using program counter 400 to identify the location in code stream 402 of the native code for the method associated with compiled activation 302.

In one embodiment of the present invention, code stream 402 contains a dummy instruction 406 immediately following the instruction "call foo" 404 which invokes a method or the runtime system. The values for tags 312, 316, and 320 are stored in an operand of dummy instruction 406.

In another embodiment of the present invention, code stream 402 contains the values for tags 312, 316, and 320, which are stored in a 32-bit word immediately following the instruction call foo 404. In this embodiment, the call to foo returns to an address 4-bytes after the call to foo, so that the execution stream skips over the 32-bit word.

Note that the 32-bit word immediately following the instruction foo contains a single bit for each tag indicating whether or not the tag is associated with a reference type. Hence, the 32-bit word can store information for up to 32 tags.

Retrieving Tag Information During a Garbage Collection Operation

Figure 5:
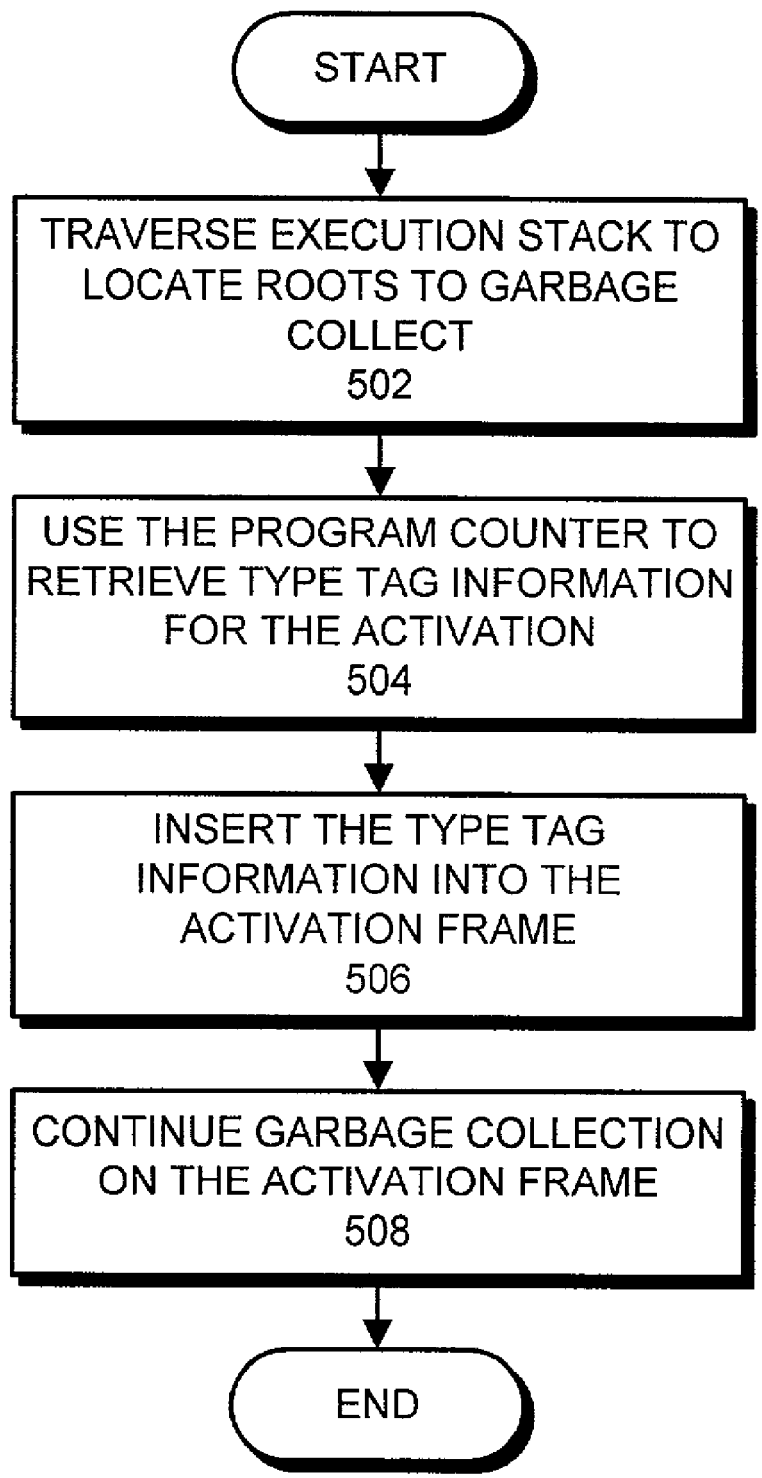
FIG. 5 is a flowchart illustrating the process of retrieving tag information during a garbage collection operation in accordance with an embodiment of the present invention.

FIG. 5 is a flowchart illustrating the process of retrieving tag information during a garbage collection operation in accordance with an embodiment of the present invention. The garbage collection operation starts by traversing the execution stack to locate roots, which are references into the heap that are used to locate objects in the heap to garbage collect (step 502). Next, the garbage collection operation uses the program counter to retrieve the type tag information for the activation from the compiled code stream (step 504). Once this information has been retrieved, the garbage collection operation inserts the tag information into the appropriate tags within the activation frame (step 506). Next, the garbage collection operation proceeds using the identified references in the activation frame (step 508). Note that the above-described process of retrieving tag information during a garbage collection operation can work in a system where all methods are compiled before execution, as well as in a mixed-mode system.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for type tagging values in a compiled activation frame to facilitate garbage collection, wherein the method operates in a mixed-mode system that supports both interpretation of byte codes and execution of compiled native code, the method comprising:
   receiving an invocation of a method;
   creating an activation frame for the method on the execution stack;
   interpreting byte code methods;
   wherein if the method is executing in interpreted mode, the interpretation involves maintaining a tag for each value in the activation frame during execution, wherein a given tag indicates whether a given value is a reference type or a primitive type; and
   wherein if the method is executing in compiled mode, prior to receiving the invocation for the method, the method further comprises:
      compiling byte codes of the method into native code; wherein the compilation process involves gathering type information for each value in the activation frame of the method and embedding the type information into the native code associated with the method, and
      creating the activation frame involves allocating space for tags for each value in the activation frame, wherein a given tag indicates whether a given value is a reference type or a primitive type;
   wherein operations to store type information into the tags in the activation frame are deferred until a subsequent garbage collection operation takes place.

2. The method of claim 1, wherein embedding the type information into the native code involves storing the type information as bit vectors, wherein each bit specifies whether a corresponding value in the activation frame is a primitive type or a reference type.

3. The method of claim 2, wherein the bit vectors are embedded in operands of dummy instructions in the native code.

4. The method of claim 2, wherein the bit vectors are embedded at locations following instructions in the native code that invoke other methods or the runtime system.

5. The method of claim 1, further comprising performing a garbage collection operation, wherein the garbage collection operation involves:

retrieving type information from the native code; and storing the type information in the tags in the activation frame of the method.

6. The method of claim 1, wherein the activation frame for the method created while executing in compiled mode and the activation frame for the method created while executing in interpreted mode are identical in structure.

7. A computer-readable storage medium storing instructions that when executed by a computer cause the computer to perform a method for type tagging values in a compiled activation frame to facilitate garbage collection, wherein the method operates in a mixed-mode system that supports both interpretation of byte codes and execution of compiled native code, the method comprising:

receiving an invocation of a method;

creating an activation frame for the method on the execution stack;

interpreting byte code methods;

wherein if the method is executing in interpreted mode, the interpretation involves maintaining a tag for each value in the activation frame during execution, wherein a given tag indicates whether a given value is a reference type or a primitive type; and wherein if the method is executing in compiled mode, prior to receiving the invocation for the method, the method further comprises:

compiling byte codes of the method into native code; wherein the compilation process involves gathering type information for each value in the activation frame of the method and embedding the type information into the native code associated with the method, and creating the activation frame involves allocating space for tags for each value in the activation frame, wherein a given tag indicates whether a given value is a reference type or a primitive type;

wherein operations to store type information into the tags in the activation frame are deferred until a subsequent garbage collection operation takes place.

8. The computer-readable storage medium of claim 7, wherein embedding the type information into the native code involves storing the type information as bit vectors, wherein each bit specifies whether a corresponding value in the activation frame is a primitive type or a reference type.

9. The computer-readable storage medium of claim 8, wherein the bit vectors are embedded in operands of dummy instructions in the native code.

10. The computer-readable storage medium of claim 8, wherein the bit vectors are embedded at locations following instructions in the native code that invoke other methods or the runtime system.

11. The computer-readable storage medium of claim 7, wherein the method further comprises performing a garbage collection operation, wherein the garbage collection operation involves:

retrieving type information from the native code; and storing the type information in the tags in the activation frame of the method.

12. The computer-readable storage medium of claim 7, wherein the activation frame for the method created while executing in compiled mode and the activation frame for the method created while executing in interpreted mode are identical in structure.

13. An apparatus for type tagging values in a compiled activation frame to facilitate garbage collection, wherein the apparatus is configured to operate in a mixed-mode system that supports both interpretation of byte codes and execution of compiled native code, comprising:

a receiving mechanism configured to receive an invocation of a method;

a creation mechanism configured to create an activation frame for the method on the execution stack;

an interpretation mechanism configured to interpret byte code methods;

wherein if the method is executing in interpreted mode, the interpretation mechanism is configured to maintain a tag for each value in the activation frame during execution, wherein a given tag indicates whether a given value is a reference type or a primitive type; and wherein if the method is executing in compiled mode, the compilation mechanism is configured to compile byte codes of the method into native code;

wherein the compilation mechanism includes, a collection mechanism configured to gather type information for each value in the activation frame of the method; and an embedding mechanism configured to embed the type information into the native code associated with the method, and the creation mechanism is configured to allocate space for tags for each value in the activation frame, wherein a given tag indicates whether a given value is a reference type or a primitive type;

wherein operations to store type information into the tags in the activation frame are deferred until a subsequent garbage collection operation takes place.

14. The apparatus of claim 13, wherein the embedding mechanism is configured to store the type information as bit vectors, wherein each bit specifies whether a corresponding value in the activation frame is a primitive type or a reference type.

15. The apparatus of claim 14, wherein the bit vectors are embedded in operands of dummy instructions in the native code.

16. The apparatus of claim 14, wherein the bit vectors are embedded at locations following instructions in the native code that invoke other methods or the runtime system.

17. The apparatus of claim 13, further comprising a garbage collection mechanism, wherein the garbage collection mechanism includes:

a retrieval mechanism configured to retrieve type information from the native code; and a storage mechanism configured to store the type information in the tags in the activation frame of the method.

18. The apparatus of claim 13, wherein the activation frame for the method created while executing in compiled mode and the activation frame for the method created while executing in interpreted mode are identical in structure.

* * * * *